United States Patent [19]

Allan

[11] 4,233,044
[45] Nov. 11, 1980

[54] SELF-CLEANING FLUID SEALED AIR FILTER

[75] Inventor: Thomas T. Allan, San Francisco, Calif.

[73] Assignee: Flanders Filters, Inc., Washington, N.C.

[21] Appl. No.: 685,977

[22] Filed: May 13, 1976

[51] Int. Cl.³ .............................................. B01D 46/54
[52] U.S. Cl. ........................................ 55/355; 55/483; 55/484; 55/502; 55/DIG. 9; 55/DIG. 31
[58] Field of Search ................. 55/355, 483, 484, 495, 55/502, 511, DIG. 31, 385 A, DIG. 9; 98/32, 40 D; 277/79, 152, DIG. 10; 220/217, 228, 357, 358

[56] References Cited

U.S. PATENT DOCUMENTS

| | | | |
|---|---|---|---|
| Re. 27,701 | 7/1973 | Allan, Jr. et al. | 55/355 |
| 685,542 | 10/1901 | Walsh | 220/228 |
| 2,367,882 | 1/1945 | McKnight | 277/79 |
| 2,701,155 | 2/1955 | Estel, Jr. | 277/152 |
| 2,746,781 | 5/1956 | Jones | 277/152 |
| 2,818,283 | 12/1957 | Hutterer | 277/152 |
| 3,280,541 | 10/1966 | Soltis | 55/483 |
| 3,486,311 | 12/1969 | Allan, Jr. | 55/355 |
| 3,720,418 | 3/1973 | Berg | 277/DIG. 10 |
| 3,870,490 | 3/1975 | Landy | 55/502 |

*Primary Examiner*—David L. Lacey
*Attorney, Agent, or Firm*—Bell, Seltzer, Park & Gibson

[57] ABSTRACT

A high efficiency air filter having a channel formed in the front peripheral surface thereof which is substantially filled with a fluid of high consistency and which is adapted to effect sealing engagement with a mating retaining flange mounted in the housing. A pair of resilient wiper lips extend across the top of the channel from opposite sides thereof to thereby contact the sides of the retaining flange while the filter is assembled in the housing, and then wipe both sides of the flange during withdrawal of the filter from the housing to thereby retain substantially all of the fluid within the channel and prevent the build-up of possibly contaminated fluid on the retaining flange.

1 Claim, 10 Drawing Figures

U.S. Patent  Nov. 11, 1980  Sheet 1 of 2  4,233,044
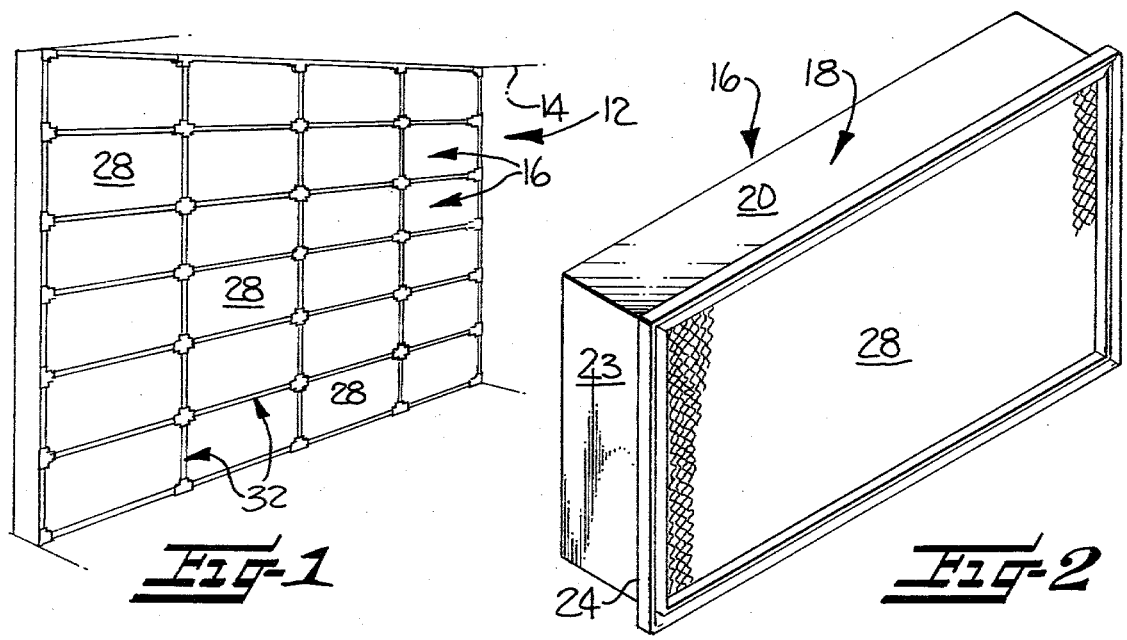
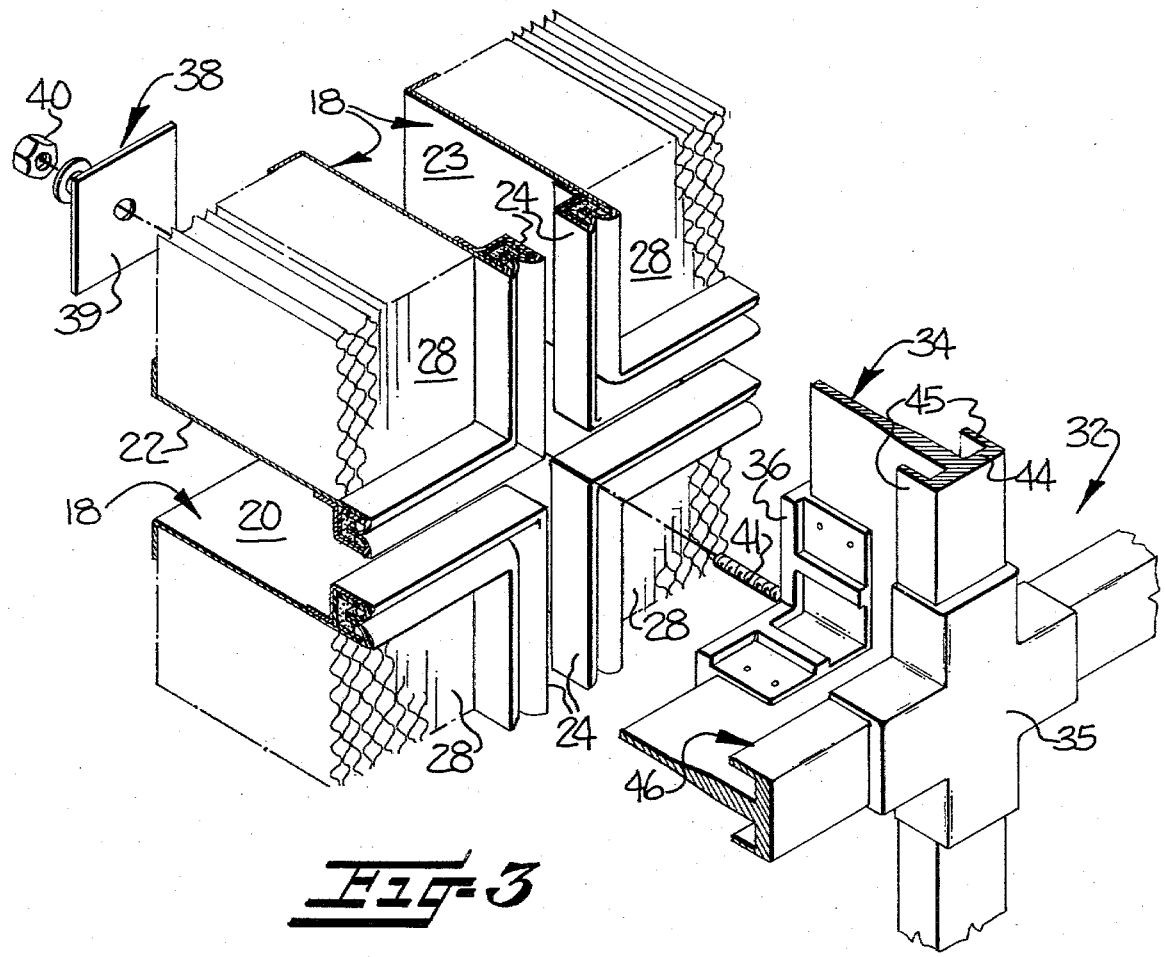

SELF-CLEANING FLUID SEALED AIR FILTER

The present invention relates to a self-cleaning fluid seal for a high efficiency air filter.

High efficiency particulate air filters (known in the art as HEPA or absolute filters) are presently widely used in a number of different industrial, research and hospital applications. For example, such filters are commonly used in conventional air handling systems to provide essentially particle free air to laboratories and critical manufacturing areas. In the case of clean rooms and other environmentally controlled enclosures, HEPA filters are adapted to provide a clean supply of air under laminar flow conditions throughout the full area of the room.

HEPA filters are also used for the collection and containment of harmful materials, such as potentially radioactive substances, dangerous viable organisms, or carcinogenic or toxic materials. Thus for example, in the case of a nuclear power generating facility, it is common to direct the exhaust of the cooling air system through one or more banks of HEPA filters to preclude the release of potentially radioactive materials into the atmosphere.

The prior U.S. patent to Allan et al, U.S. Pat. No. Re. 27,701 discloses a high efficiency or HEPA air filter of the above described type which utilizes a fluid of high consistency to seal the filter in a supporting housing. More particularly, the Allan et al filter has a continuous channel formed in the front periphery of the frame, and a fluid having a consistency substantially the same as that of household petrolatum is disposed in the channel. The fluid filled channel is adapted to sealably receive a mating retaining flange mounted in the housing, with the retaining flange being embedded in the fluid to seal the filter in assembled relation therein.

The fluid sealing structure of the Allan et al patent represents a vast improvement over the previously employed neoprene gasket seals, and has met with a great deal of commercial success since a near perfect and non-deteriorating seal is achieved under normal operating conditions. However, in certain instances where the fluid sealed filter is utilized for the collection and containment of harmful materials as noted above, the presence of the fluid in the air filtration system has been a source of concern. More particularly, it has been feared that the harmful materials may contaminate the fluid, and that a small portion thereof may adhere to and remain on the surfaces of the mating retaining flange in the housing as contaminated residue after the periodic replacement of the filters. As will be readily apparent, the build-up of a potentially contaminated residue in the housing could result in a substantial safety hazard.

It is accordingly an object of the present invention to provide a fluid sealed high efficiency air filter having provision for insuring that substantially all contaminated materials are collected and removed from the housing upon each change of the filter.

It is another object of the present invention to provide a fluid sealed high efficiency air filter having provision for substantially covering the fluid, and thereby reducing the opportunity for the fluid to become contaminated, as well as the opportunity for any gases emanating from the fluid to enter the airstream.

It is a more particular object of the present invention to provide a high efficiency air filter of the described type and wherein the fluid filled channel is substantially covered by opposing wiper lips which contact the retaining flange while the filter is operatively positioned in the housing, and further act to wipe any fluid therefrom upon removal of the filter from the housing.

These and other objects and advantages of the present invention are achieved in the embodiments illustrated herein by the provision of a high efficiency air filter having a fluid filled channel provided in the front peripheral surface of the frame, and means carried by the frame for contacting each side of the mating retaining flange of the housing during assembly of the filter into the housing and while the filter is assembled therein, and for wiping the sides of the retaining flange substantially free of the fluid upon the filter being withdrawn from the retaining flange and housing. In one preferred embodiment, this contacting and wiping means comprises an extruded elastomeric member having a U-shaped portion disposed within the channel of the filter frame, and a pair of resilient wiper lips mounted to extend across the top of the U-shaped portion and the channel. The fluid is disposed within the U-shaped portion.

In an alternative embodiment, the contacting and wiping means comprises a relatively flat, gasket-like member adhered to the front peripheral surface of the frame, and including a slit along the length thereof for receiving and engaging the mating retaining flange.

Some of the objects of the invention having been stated, other objects will appear as the description proceeds, when taken in connection with the accompanying drawings, in which—

FIG. 1 is a fragmentary perspective view of a vertically disposed bank of filters which embodies the present invention and which is positioned within a duct forming a part of an exhaust air cleaning system or the like;

FIG. 2 is a perspective view of one of the filters employed in the bank of FIG. 1;

FIG. 3 is a fragmentary exploded perspective view illustrating the manner in which the filters are assembled to the supporting gridwork in the bank of FIG. 1;

Figure 4:
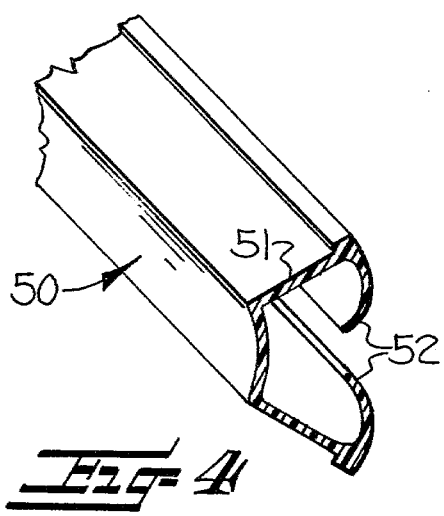
FIG. 4 is a fragmentary perspective view of the wiping member employed with the filter of FIG. 2.

Referring more specifically to the drawings, FIGS. 1–5 illustrate a bank of filters 12 embodying the present invention and which is disposed in a vertical arrangement within a housing 14, such as an exhaust duct in an air cleaning system or the like. More particularly, the bank 12 comprises a plurality of individual high efficiency air filters 16 which are disposed in a side-by-side or parallel arrangement, and each filter 16 comprises a rectangular frame 18 defining a centrally disposed air flow opening therethrough. In the illustrated embodiment, the frame 18 comprises four sheet metal sides 20, 21, 22, 23, and a continuous peripheral sheet metal member 24 of angled cross-section attached to the sides by welding or the like. The sides 20–23 and member 24 cooperate to define a front peripheral surface 25 which surrounds the air flow opening, and with a continuous U-shaped channel 26 disposed in the front surface. Typically, the filters 16 each measure 36×24×5⅞ inches, and the channel 26 has a width and depth of about ⅜ inches.

A filter pack 28 is sealably disposed within the frame 18, and fills the air flow opening. Conventionally, the filter pack 28 comprises a sheet of filtering media folded in accordion fashion, and with the folds thereof lying substantially parallel to the direction of air flow through the filter. The sheet of filtering media may be fabricated, for example, from glass, ceramic, or cellulose-asbestos. In the case of HEPA or absolute filters, the filters have extremely high dust retention characteristics, usually greater than about 95% efficiency in removing sub-micron sized particles from the airstream, and typically 99.97% efficiency, as measured by the conventional DOP test.

A fluid 30 substantially fills the channel 26 to a level not above the front surface 25 of the frame. Several highly viscous, non-Newtonian fluids, such as household petrolatum, or a silicone grease having a consistency substantially the same as that of household petrolatum, have been found to be very satisfactory for use as the fluid. Such fluids may be further characterized as being non-corrosive, non-evaporating, semi-solid at room temperature, and subject to easy deformation at room temperature. As a particular example, a silicone grease manufactured and sold by Dow Chemical Corporation as Product No. 111 may be employed. This silicone material has an N.L.G.I. consistency of 2 to 3, and a penetration (ASTM D217) of about 220–240. Also, it maintains its consistency over a temperature range from about $-40$ to 500 F., which is desirable where the filter may be subjected to temperature extremes.

To support the filters 16 in the bank 12 as shown in FIG. 1, there is provided a structural gridwork 32 of interconnected T-shaped members 34 which is fixedly mounted in the housing 14. The T-shaped members 34 may be fabricated from a suitable metallic material, such as extruded aluminum, and are interconnected in the indicated rectangular arrangement by the cross connectors 35 and junction couplings 36 which are fixedly attached to the associated T-shaped members 34 by suitable rivets or the like. By this arrangement, the T-shaped members define a plurality of rectangular open areas, with each open area receiving one of the filters. To further support the filters, a bolt assembly 38 is disposed at each of the rear corners of each filter. Each bolt assembly includes a flat plate 39 which, in most instances within the bank 12, overlies the adjacent corners of four adjacent filters in the manner apparent from FIG. 3. Also, each assembly 38 includes a nut 40 which is adapted to threadedly engage the bolt 41 attached to each junction coupling 36 to thereby releasably retain the filters on the gridwork as hereinafter further described.

The T-shaped members 34 further comprise a forward cross bar 44 and a rearwardly directed flange 45 carried along each side of the cross bar. The four flanges 45 thus disposed within each open area of the gridwork define (together with a portion of the cross connectors 35) a continuous, four-sided retaining flange 46 which has a cross-sectional outline corresponding to that of the channel 26 in the frame of the associated filter. In this regard, it will be understood that the members 34 about the periphery of the bank 12 have an L-shaped cross-section as opposed to a T-shaped configuration, and thus have only one flange 45 associated therewith, and that these peripheral members may be sealably connected to the walls of the housing 14 by means of a suitable mastic sealant or the like.

In use, the filters 16 are initially assembled onto the gridwork 32 by positioning each filter in one of the openings, and in an adjacent face to face relationship with the associated retaining flange 46 as indicated in FIG. 3. In this position, the filter rests upon the surface of the lower junction couplings 36, which serve to support the weight thereof. The filter is then translated forwardly toward the retaining flange 46 such that the flange is embedded within the fluid 30 of the channel 36 to effect a seal between the filter 16 and gridwork 32. To more permanently hold the filter in its assembled position, a bolt assembly 38 is connected at each of the four rear corners of the filter.

Upon the termination of the useful life of the filters, which can vary from a matter of days to several years depending upon the nature of the airstream to which it is subjected, each filter is removed by releasing the bolt assemblies 38 and rearwardly translating the filter. A new filter may then be installed in each opening in the manner described above.

In accordance with the present invention, the frame 18 of each filter 16 carries means for contacting each side of the mating retaining flange 46 during assembly of the filter onto the gridwork and while the filter is assembled thereon, and for wiping the sides of the retaining flange substantially free of the fluid 30 upon the filter being withdrawn from the retaining flange. In the embodiment of FIGS. 1–5, the contacting and wiping means comprises a resilient elastomeric wiping member 50 having a U-shaped portion 51 disposed within the channel 26 and a pair of resilient wiper lips 52 mounted to extend across the top of the U-shaped portion and the channel. The fluid 30 is disposed within the U-shaped portion, and generally below the wiper lips.

The wiping member 50 preferably comprises an extruded rubber-like material, such as neoprene, silicone rubber, plastisol or other similar material which is highly resilient and possesses a high degree of memory. In this regard, FIG. 4 indicates the approximate shape of the member 50 immediately upon the extrusion thereof, and it will be understood that a suitable length of the extruded material will be cut and shaped to the desired rectangular outline, and then fitted into the channel. As a particular example, the extruded material may be cut into four segments which generally correspond in length to the length of the four sides of the frame 18, and the ends of the segments then beveled and interconnected by a suitable adhesive to form a right angled miter joint at each corner. Also, it will be appreciated that the somewhat open configuration of the member 50 as seen in FIG. 4 results in the side walls of the U-shaped portion 51 being resiliently compressed toward each other upon fitting the member into the channel, to thereby result in a seal between the side walls of the member and the channel. In this regard, the flange 45 may be of a length sufficient to engage the bottom wall of member 50 when in assembled relation (not shown), to thereby provide a gasket-like pressure seal between the member 50 and the channel.

Figure 5:
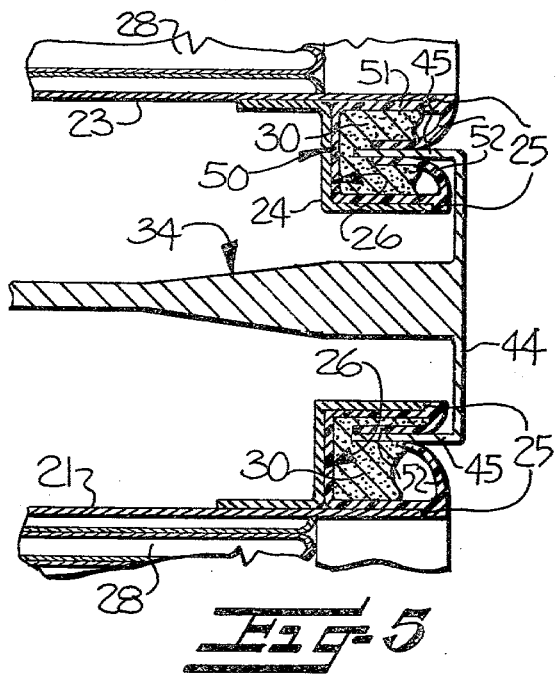
FIG. 5 is a fragmentary sectional view of a portion of the supporting gridwork and associated filters in the bank of FIG. 1, and illustrating the manner in which the retaining flanges of the gridwork are received within the channels and wiping members.

The walls of the wiping member 50 as illustrated in FIGS. 4-5 have a thickness of about 1/16 inches, and the wiper lips 52 are arcuately curved in cross-section such that the outer extremities thereof extend downwardly into the U-shaped portion 51 and into the fluid 30. The lips 52 are highly flexible, and are thereby able to accommodate a degree of non-alignment between the channel 26 and retaining flange 46 without loss of the wiping function as illustrated in FIG. 5.

Figure 6:
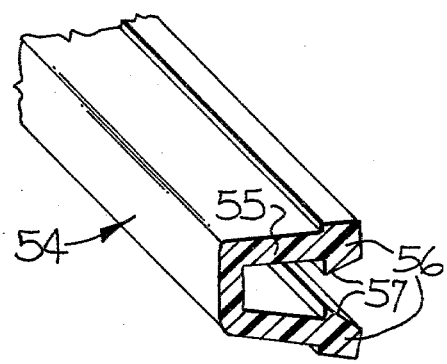
FIG. 6 is a fragmentary perspective view of another embodiment of the wiping member.
Figure 7:
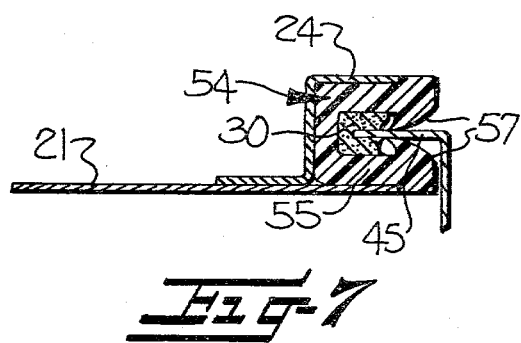
FIG. 7 is a fragmentary sectional view of a portion of a filter and mating retaining flange, and including the wiping member of FIG. 6.

A somewhat different embodiment of the contacting and wiping means is illustrated in FIGS. 6-7, which illustrates a wiping member 54 having a U-shaped portion 55 and wiper lips 56. In this case, the member 54 may be extruded from a similar elastomeric material as described above, although the walls are substantially thicker, for example, about 3/16 inches. Also, the wiper lips 56 include opposing edge faces 57 which are angled with respect to each other to define an outwardly facing V-shaped notch which is adapted to engagingly receive the mating retaining flange 45 in the manner illustrated in FIG. 7.

Figure 8:
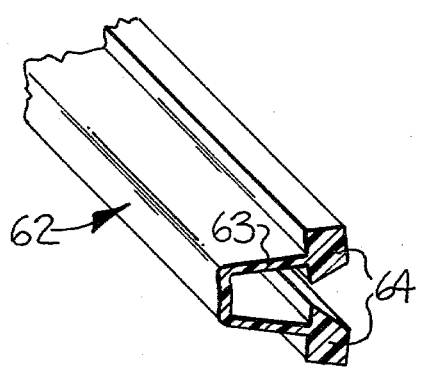
FIG. 8 is a fragmentary perspective view of still another embodiment of the wiping member.
Figure 9:
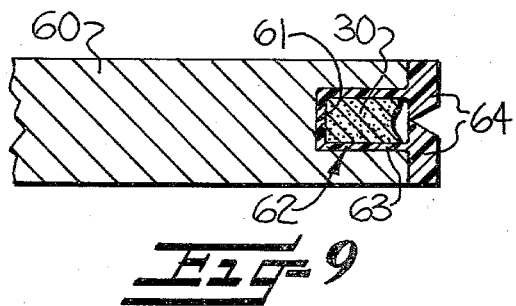
FIG. 9 is a fragmentary sectional view of a portion of a filter frame employing the wiping member of FIG. 8.

A further embodiment is illustrated in FIGS. 8 and 9, wherein the present invention is illustrated in association with a filter frame 60 which comprises a wooden or chipboard material having a thickness of about ¾ inches, and which has the channel 61 provided in the material of the frame. Typically, the channel 61 measures about ¾ inches deep and ½ inches wide. The wiping member 62 of this embodiment is generally similar to the member 54 of the embodiment of FIGS. 6-7, with the exception that the walls of the U-shaped portion 63 are relatively thin, for example, about 1/16 inches, to permit reception in the more narrow channel 61, while the wiper lips 64 are relatively thick, for example about 3/16 inches.

Figure 10:
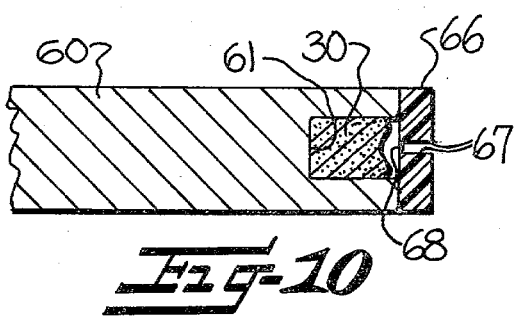
FIG. 10 is a view similar to FIG. 9, but illustrating still another embodiment of the wiping member.

Still another embodiment of the present invention is illustrated in FIG. 10, which also is shown in association with a wooden or chipboard filter frame 60. In this case, the contacting and wiping means comprises a relatively flat gasket-like wiping member 66 having a thickness of about 3/16 inches and which is adhesively secured to the front peripheral surface of the frame and covering the fluid-filled channel 61. The member 66 may be extruded or formed from a flat sheet of conventional elastomeric gasket material, such as neoprene rubber, which is then slit along its length to define opposing edge faces 67 which are spaced apart a distance somewhat less than the width of the mating retaining flange (not shown). Thus the faces 67 engage the flange during assembly of the filter in the housing, as well as during use of the filter and subsequent removal thereof. To facilitate the attachment of the member 66 to the front surface, the member 66 may be initially only partially slit or otherwise shaped to include a frangible interconnecting portion 68 between the two segments on opposite sides of the slit. After attachment of the member 66 to the frame, this interconnecting portion may be cut, either by use of a separate knife prior to the assembly of the filter onto the gridwork, or by the entry of the retaining flange 46 itself through the slit and into the fluid filled channel. The member 66 may be fabricated from any of the elastomeric materials noted above.

While the present invention has been illustrated in association which a large gridwork comprising a number of filters in a bank, it will be understood that the invention is also applicable for use in association with conventional box-like housings which support one, two, or other small number of filters in an air duct system. Also, while the illustrated embodiments of the channels and wiping members are of generally rectangular outline, it should be understood that the term "U-shaped" as employed herein is intended to include a cross-sectional outline having somewhat tapered or converging side walls. This latter configuration would be useful in certain instances to guide the mating retaining flange into the channel and thereby centrally align the filter during the assembly of the filter onto the flange.

In the drawings and specification, there has been set forth a preferred embodiment of the invention, and although specific terms are employed, they are used in a generic and descriptive sense only and not for purposes of limitation.

That which is claimed is:

1. A high efficiency air filter comprising a frame formed of wooden or chipboard material and having a centrally disposed air flow opening therethrough and a front peripheral surface surrounding said airflow opening, a continuous channel formed in said front peripheral surface in the material of said frame and extending rearwardly from said front surface of said frame a substantial distance, a filter pack sealably disposed within said frame and filling said air flow opening, a fluid substantially filling said channel to a level not above said front surface and having a consistency substantially the same as that of petrolatum and characterized as being subject to easy deformation at room temperature, and such that the fluid filled sealing channel is adapted to sealably receive a mating retaining flange in the housing to seal the filter in assembled relation therein, the improvement therein comprising means mounted to said frame for contacting each side of the mating retaining flange and for wiping the sides of the retaining flange substantially free of the fluid upon the filter being withdrawn from the retaining flange and housing, said contacting and wiping means comprising a pair of resilient wiper lips adhered to said front surface of said frame and extending across the top of said channel from opposite sides thereof to substantially cover and enclose said fluid, and a frangible portion interconnecting said wiper lips.

* * * * *